(12) United States Patent
Martin et al.

(10) Patent No.: US 8,061,380 B1
(45) Date of Patent: *Nov. 22, 2011

(54) AUTOMATIC FLOW SHUT-OFF SYSTEM

(76) Inventors: James B. Martin, Granbury, TX (US); Lloyd G. Jones, Granbury, TX (US)

( * ) Notice: Subject to any disclaimer, the term of this patent is extended or adjusted under 35 U.S.C. 154(b) by 704 days.

This patent is subject to a terminal disclaimer.

(21) Appl. No.: 12/229,172

(22) Filed: Aug. 20, 2008

Related U.S. Application Data

(60) Provisional application No. 60/994,096, filed on Sep. 17, 2007.

(51) Int. Cl.
*F16K 17/36* (2006.01)
(52) U.S. Cl. ......... 137/312; 137/67; 137/68.11; 251/74; 251/67; 122/504; 122/507; 122/14.3
(58) Field of Classification Search .............. 137/312, 137/67, 68.11; 122/504, 14.03, 507; 251/67, 251/73, 74
See application file for complete search history.

(56) References Cited

U.S. PATENT DOCUMENTS

| | | | |
|---|---|---|---|
| 2,798,503 A | 7/1957 | Carver et al. | |
| 3,920,031 A * | 11/1975 | Maxfield | 137/67 |
| 4,305,420 A | 12/1981 | Nussdorf | |
| 4,381,710 A * | 5/1983 | Watterback | 102/200 |
| 4,696,319 A * | 9/1987 | Gant | 137/78.3 |
| 4,930,934 A | 6/1990 | Adkins | |
| 5,771,916 A * | 6/1998 | Armenia et al. | 137/67 |
| 6,024,116 A | 2/2000 | Almberg et al. | |
| 6,117,311 A | 9/2000 | Stockhowe et al. | |
| 6,253,785 B1 * | 7/2001 | Shumake et al. | 137/312 |
| 6,336,469 B1 | 1/2002 | Nixon et al. | |
| 6,354,322 B2 | 3/2002 | Clark | |
| 6,543,471 B1 * | 4/2003 | Carroll | 137/312 |
| 6,899,122 B1 * | 5/2005 | Mele | 137/312 |
| 7,082,959 B1 * | 8/2006 | Franklin | 137/312 |
| 7,424,896 B1 * | 9/2008 | Martin et al. | 137/312 |
| 7,562,673 B1 * | 7/2009 | Martin et al. | 137/312 |
| 7,703,476 B1 * | 4/2010 | Carroll | 137/421 |
| 2004/0081804 A1 * | 4/2004 | Basler et al. | 428/174 |

* cited by examiner

*Primary Examiner* — John Rivell
*Assistant Examiner* — Minh Le
(74) *Attorney, Agent, or Firm* — Drude Faulconer

(57) ABSTRACT

A tripper unit for actuating a device (e.g. valve-closing actuator) upon contact with water. Basically, the tripper unit is comprised of a housing having a replaceable cartridge therein which, in turn, is wrapped with an adsorbent paper which prevents a plunger from moving downward. When a leak occurs, water will flow into the housing and into contact with the adsorbent paper which will quickly disintegrate to allow a compression spring in said housing to move the plunger downward to thereby actuate the unit.

10 Claims, 5 Drawing Sheets

AUTOMATIC FLOW SHUT-OFF SYSTEM

CROSS-REFERENCE TO EARLIER APPLICATION

The present application claims the priority of U.S. Provisional Application No. 60/994,096, filed Sep. 17, 2007.

DESCRIPTION

1. Technical Field

The present invention relates to an automatic flow shut-off system and more particularly relates to a system for automatically shutting off the water to an appliance (e.g. hot water heater, commode, washer, etc.) when the appliance ruptures or springs a leak.

2. Background of the Invention

Almost everyone is familiar with the problems caused by unexpected leaks or overflows in household or commercial appliances such as hot water heaters, commodes, and the like. For example, if the tank of a hot water heater cracks or springs a leak which goes undetected for any period of time, the results can be economically devastating. That is, water will continuously flow into the leaking tank and out onto the floor until the leak is detected and the water is cut off. If the owner is away on vacation or does not promptly become aware of the leak or rupture, the premises quickly floods which, in turn, can cause extensive damage to the affected floors, rugs, etc. Sometimes, the floor surfaces and adjacent furniture are damaged to the extent that they have to be replaced which can be both very expensive and depressing.

The same type of situation may exist where a commode becomes plugged or has a defective flush system. The tank or stool can overflow thereby causing substantial damage to the floor and surrounding area before the water can be turned off. Further, washing machines, ice makers, etc. can develop leaks which, if not quickly discovered, can cause similar damage. Unfortunately, damage caused by such flooding may not be covered under some standard homeowner's insurance policies so the costs for such damages in those instances must be borne solely by the owner.

The possibility of undetected leaks occurring in such appliances has been long recognized and several different approaches have been proposed for addressing this problem. For example; see U.S. Pat. Nos. 2,798,503; 3,920,031; 4,305,420; 5,771,916; 6,024,116; 6,253,785 B1; 6,336,469 B1; 6,543,471 B1; and 6,354,322 B2; all of which disclose systems for shutting off the water and/or gas supply if a leak should occur in a hot water heater.

While all of these references disclose workable solutions, each require at least one of the following: (1) a pan or tray in which the hot water heater is located; (2) connections for electrical power; and/or (3) the installation of a special valve into the supply line(s) thereby making the initial cost and installation thereof relatively expensive for a "do-it-yourselfer" who wishes to retro-fit an already installed appliance.

Accordingly, a need exists for an inexpensive, automatic flow shut-off system which can easily be retro-fitted into the standard plumbing of most already installed, modern household or commercial appliances (i.e. hot water heaters, commodes, etc.) by a person with only minimal plumbing skills.

Recently, automatic flow shut-off systems have been purposed which meets all of these requirements; see co-pending U.S. application Ser. Nos. 11/114,748, filed Apr. 25, 2005 and 11/354,755, filed Feb. 15, 2006. The present invention is a still further improvement in such flow cut-off systems.

SUMMARY OF THE INVENTION

The present invention provides an automatic flow shut-off system for shutting off a valve in a water supply line to an appliance when a leak develops at the appliance. The present system does not require that a drain pan be used with the appliance (e.g. hot water heater), requires no electricity for its operation, and requires no specially-designed valves for its installation.

More specially, the system of the present invention includes a tripper unit for actuating a device (e.g. valve-closing actuator) upon contact with water such as will be present when an appliance (e.g. hot water heater, commode, etc.) develops a leak or the like. Basically, the tripper unit has a housing which is positioned in proximity of the appliance and has openings therein which allow any water surrounding the appliance to enter into the housing. A downwardly compression spring-biased plunger is slidably mounted in the housing and rests on and is prevented from moving downward by a water reactive material for so long as the material remains dry. Preferably, this material is comprised of an absorbent paper material (e.g. common-available paper towels) which when of a proper thickness is strong enough to resist the movement of the plunger when the material is dry, but is one which will quickly weaken and disintegrate upon contact with water. Other water reactive materials include starch based materials, etc.

When a leak or the like develops around the appliance, water will flow into the housing and into contact with the water reactive material. In a very short period of time (1-2 minutes or less), the material will absorb the water which, in turn, causes the reactive material to disintegrate to the point that the downwardly-biased plunger will be propelled downward in the housing to thereby actuate the valve actuator and shut off the supply of water to the appliance. As will be recognized, this can prevent significant damage to the areas surrounding and in proximity of the appliance.

In the present invention, the tripper unit is a separate component which operates a remote valve actuator of the flow shut-off system which has a housing affixed over the cut-off valve in the supply line. A spring in the valve actuator is latched in a "cocked" position by a latch lever on the housing. One end of the lever is coupled to the plunger within the tripper unit by a length of flexible material, e.g. cord, wire, chain, or the like. When a leak occurs, the plunger moves downward within the tripper unit, pulling the cord downward to unlatch the lever and release the spring to thereby move the valve to its closed position.

BRIEF DESCRIPTION OF THE DRAWINGS

The actual construction operation, and apparent advantages of the present invention will be better understood by referring to the drawings, not necessarily to scale, in which like numerals identify like parts and in which.

While the invention will be described in connection with its preferred embodiments, it will be understood that this invention is not limited thereto. On the contrary, the invention is intended to cover all alternatives, modifications, and equivalents that may be included within the spirit and scope of the invention.

DESCRIPTION OF THE PREFERRED EMBODIMENTS

Figure 1:
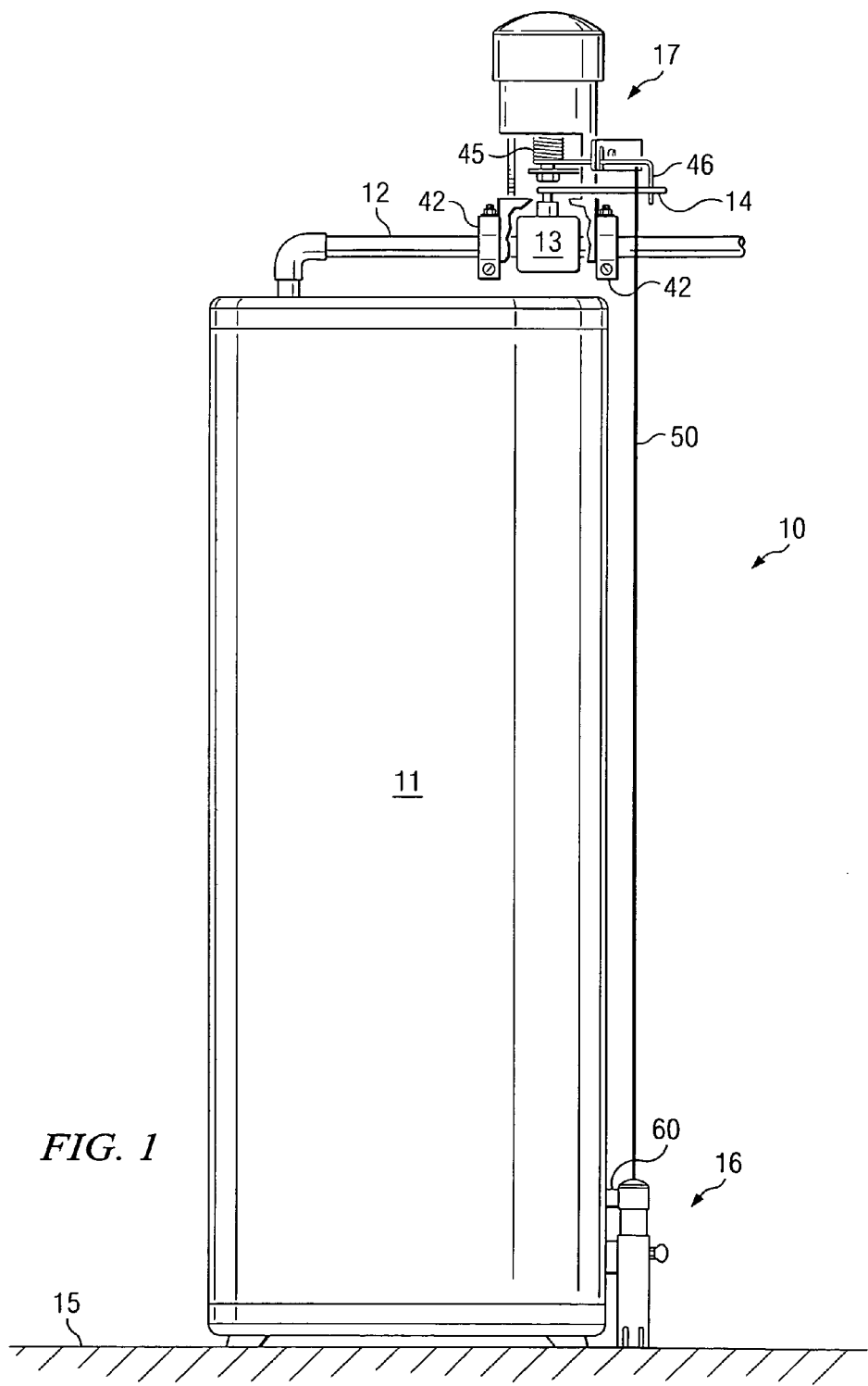
FIG. 1 is a perspective side view, partly in section, of a typical hot water heater having the automatic flow shut-off system of the present invention installed thereon.

Referring more particularly to the drawings, FIG. 1 illustrates the automatic flow shut-off system 10 of the present invention when used with a typical hot water heater 11. Water heater 11 is positioned on a substantially horizontal floor 15 and has a water supply line 12 connected thereto. It should be understood that shut-off system 10 can be installed at the time of the original installation of a water heater or the system may be bought as a kit and installed into already installed hot water heaters. Again, it is pointed out that it is not necessary for the hot water heater to be positioned in a "pan" or the like for the present invention to function as is the case with several prior art devices but that it will operate in the same manner if the hot water heater sits within a pan.

Typically, the existing plumbing for many installed water heaters include a standard type ball valve 13 for controlling the flow of water through line 12 and such a standard ball valve can easily be installed if required. As will be understood in the art, ball valve 13 remains open during normal operation to supply water to tank of water heater 11, as needed, to keep the tank at its desired capacity. Ball valve 13 typically has a lever or arm 14 attached to its stem (not shown) by which the ball can be manually rotated through a 45° arc to open and close valve 13, as will be understood in the art.

Flow shut-off system 10, as shown in FIG. 1, is comprised of a tripper unit 16 and a valve actuator unit 17. Tripper unit 16 is adapted to be positioned on floor 15 adjacent the lower end of water heater 11 or within a pan (not shown) if present so that the tripper will detect any significant water that might accumulate at that point. That is, if the tank of water heater 11 should rupture or spring a leak, tripper unit 16 senses the leaking water and actuates valve actuator unit 17 to shut off the flow of water through line 12 as will be described below.

Figure 2:
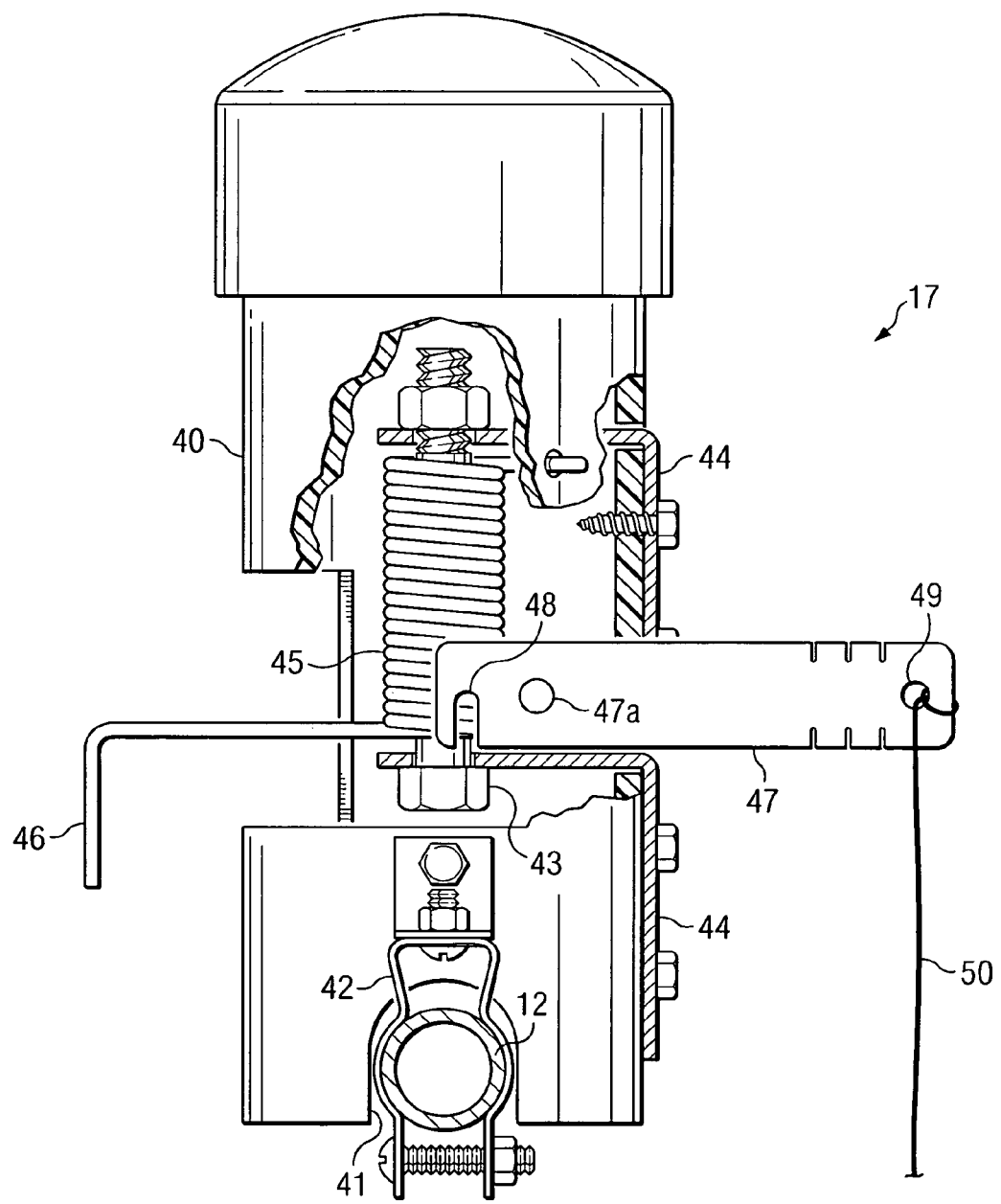
FIG. 2 is an enlarged view, partly in section, of the valve actuator unit of the present invention for actuating a ball valve in the automatic flow shut-off system shown in FIG. 1.

Valve actuator unit 17 is designed to shut off a ball valve 13 in line 12. Referring now to FIG. 2, unit 17 is comprised of a housing 40 having diametrically opposed slots 41 (only one shown in FIG. 3) formed through the lower end of the wall of the housing. These slots are adapted to fit over and receive a water supply line 12 (FIG. 1) when actuator unit is placed over ball valve 13. Pipe clamps 42 or the like are secured to housing 40 adjacent to the slots 41 by which actuator 17 is secured in place onto line 12.

A shaft 43 is secured between supports 44 in housing 40 and has a torsion spring 45 positioned thereon with one end of the spring being secured to upper support 44 and the other or free end extending outward from the shaft and terminating in a 90° bend which, in turn, forms leg or impact surface 46. A latch lever 47 is rotatably mounted about pivot 47a on the side of housing 40 and has a hole 49 or the like at one end to which a length of flexible material 50 (e.g. wire cable) is attached. For a more complete description of valve actuators of this type, see co-pending U.S. application Ser. Nos. 11/114,748, filed Apr. 25, 2005 and 11/354,755, filed Feb. 15, 2006, both of which are incorporated herein in their entireties by reference.

Figure 3:
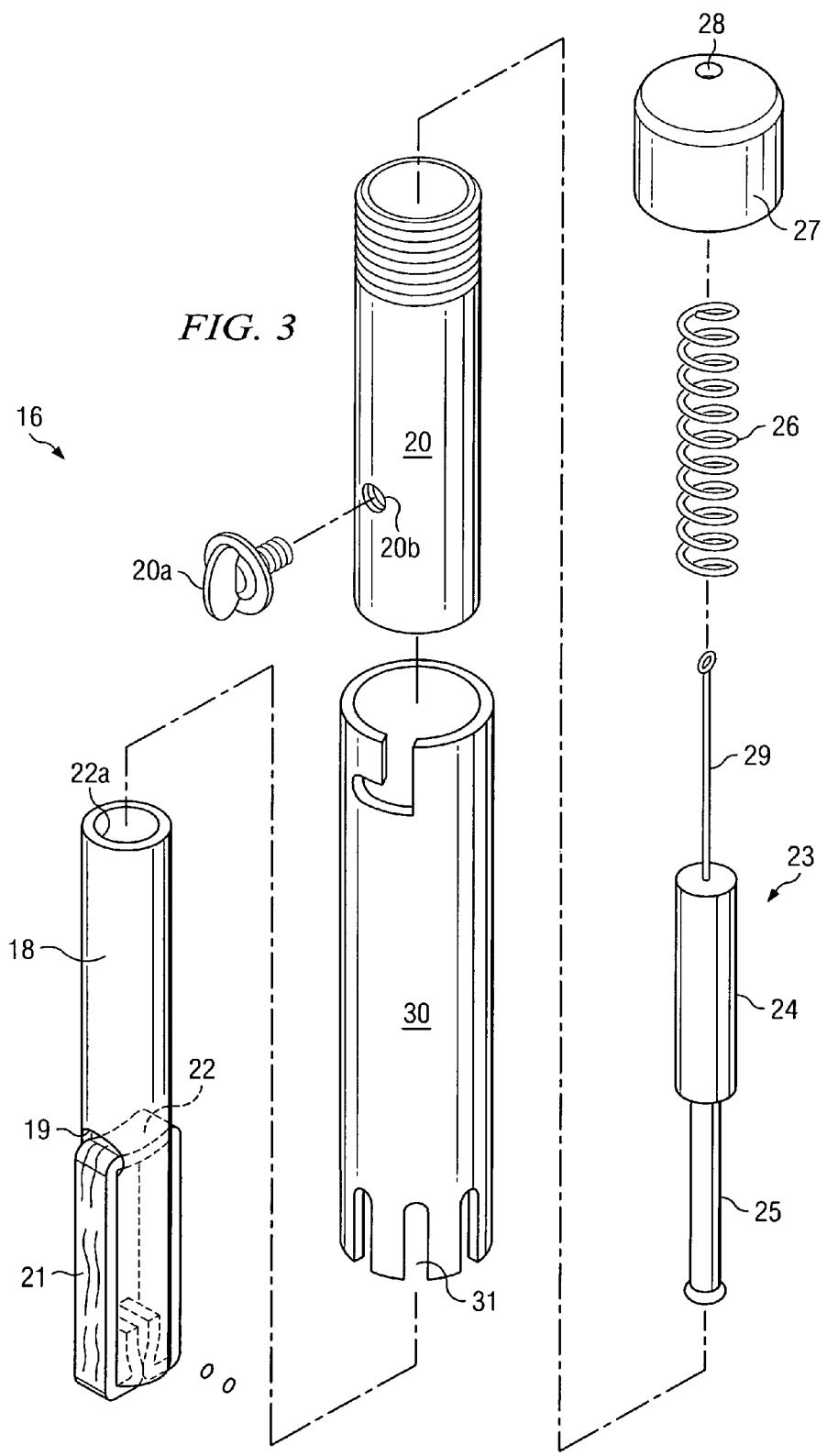
FIG. 3 is an enlarged, exploded view of the tripper unit of the automatic flow shut-off system shown in FIG. 1.
Figures 4A, 4B, 5:
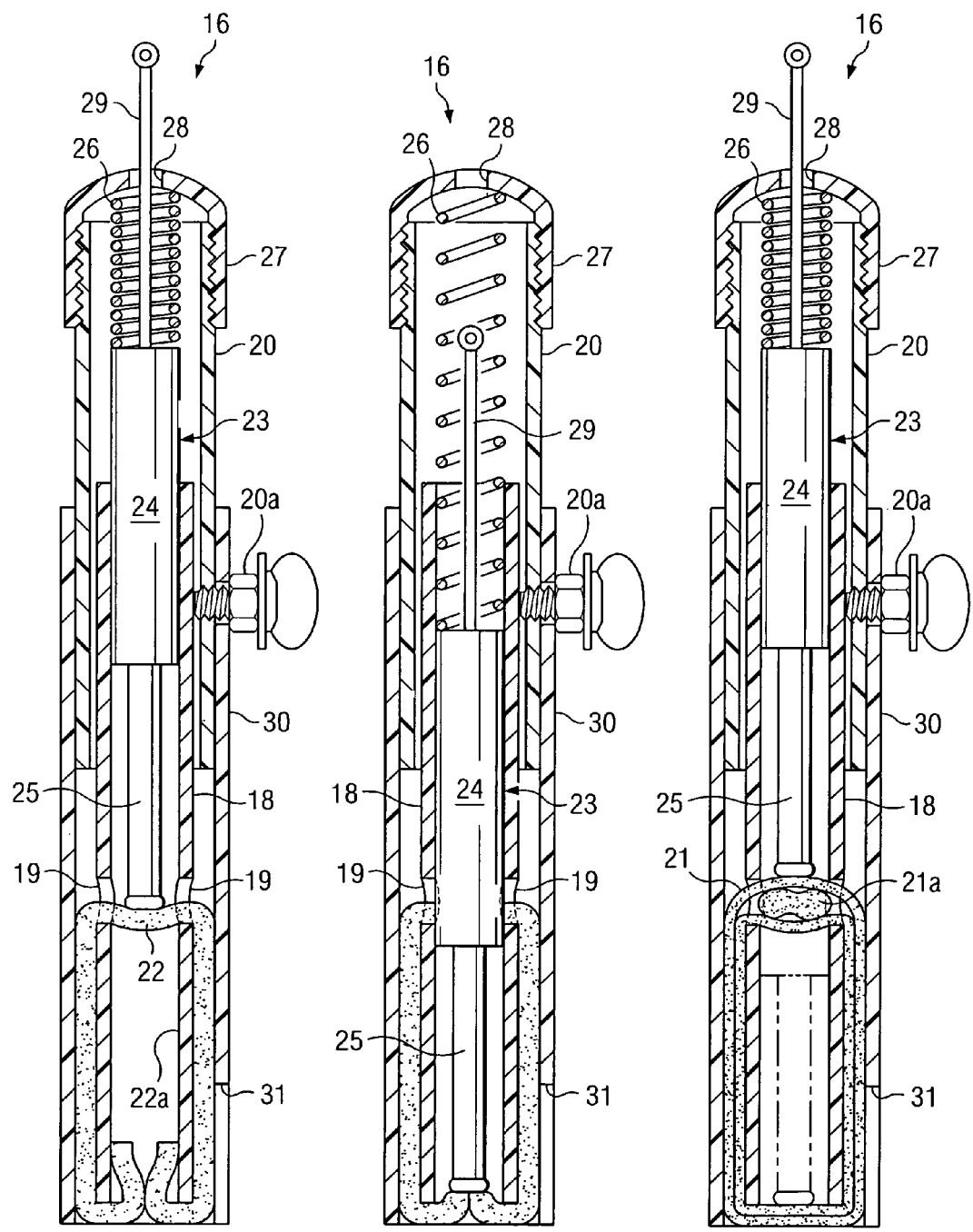
FIG. 4A is an enlarged, cross-sectional view of the tripper unit of FIG. 1 when said tripper is in a non-actuated position.
FIG. 4B is a cross-section view of the tripper unit of FIG. 4A after it has been actuated by contact with water.
FIG. 5 is a cross-sectional view of the tripper unit of FIG. 4A showing an embodiment of the water-reactive material.

Referring now to FIGS. 3, 4A, and 4B, the details of the preferred tripper unit 16 of the present invention will now be set forth. It should be understood that the components of tripper unit 16 may be constructed from any appropriate material (e.g. metal, plastics, etc.). More specifically, tripper unit 16 is extremely simple but highly effective and is comprised of a relatively short, elongated, hollow cartridge housing 18 which has a pair of diametrically-opposed openings 19 through the wall for a purpose explained below. Cartridge housing 18 is telescoped into spring housing 20 and the two are held together by a set screw 20a or the like which passes through threaded opening 20b (FIG. 3).

As shown, a water reactive material 21 is positioned within the bore 22a of cartridge housing 18 to form a bridge portion 22 there across. While several water reactive materials can be used (e.g. sugar, salts, starch-based material, etc. in disk, pad, or pellet form or the like, where appropriate), preferably the water reactive material 21 is comprised of a water absorbent paper such as common toilet paper, paper towels, etc. which is rolled into an essentially, concentrically-layered, ribbon-like strip of a sufficient thickness to provide the resistive force necessary to keep tripper unit 16 from "tripping" as long as the paper remains dry. The rolled ribbon of paper 21 is then threaded through openings 19 in the cartridge housing 18 to form bridge portion 22 within the housing.

Referring again to the FIG. 3, tripper unit 16 includes a plunger 23 which is comprised of a guide portion 24 and plunger rod 25 depending thereof. Guide portion 24 is slidably positioned in bore 20 of cartridge 18 so that rod 25 rests on bridge portion 22 of the water reactive material 21. A compression spring 26 is positioned within spring housing 20 and acts on the top of guide portion 24 to normally bias plunger 23 downward within cartridge housing 18 when tripper unit 16 is assembled.

A cap 27 is threaded or otherwise secured onto spring housing 20 and has an opening 28 therein. An eye 29 is secured to the top of guide portion 24 of plunger 23 and passes through opening 28 in cap 27. Eye 29 is adapted to be connected to flexible member 50 to thereby connect the plunger 23 to valve actuator unit 17 (FIG. 1).

While tripper unit 16 will operate for its intended purpose with only the above components assembled as described, preferably a protective sleeve 30 is concentrically positioned over the cartridge housing 18 and the lower end of spring housing 20 and is also held in position by set screw 20a. Weep holes 31 are provided around the lower periphery of the housing to allow the entry of water into contact with water reactive material 21. This sleeve is provided to protect water reactive material 21 from accidental failure, e.g. gnawing by rodents or the like.

In operation, tripper unit 16 is positioned next to a water-using appliance, e.g. hot water heater 11 and may be secured thereto or to strip 60 by any appropriate means, e.g. hook tape 24a such as VELCRO®. If the appliance should leak water for any reason, the water will begin to accumulate on floor 15 and will flow through openings 31 in sleeve 30 and into contact with the water absorbent material 21 on cartridge housing 18. The water will immediately begin to react with material (i.e. wick upward into all of the layers of the absorbent paper) and will quickly begin to weaken and disintegrate the paper forming bridge portion 22. Once the material 21 sufficiently weakens, compressed spring 26 forces plunger 23 downward through weakened material 21 to pull flexible member 50 downward with authority to actuate valve actuator 17 to thereby close valve 13.

As an example of how quick the tripper unit 16 will respond, it has been found that it takes only approximately less than 2 minutes for unit 16 to trip once water which has accumulated only to a depth of 1/8 inch or less on floor 15. Further, it has been found that unit 16 will even trip within a couple of days when only slight moisture remains on the floor for an extended time. In either event, tripper unit 16 responds and the water to heater 11 is shut off before any significant damage, if any at all, can occur.

FIG. 5 illustrates an embodiment of the present invention wherein the water reactive material 21 is reinforced by additional water reactive material 21a. The additional material 21a is merely positioned between layers of the material 21 (i.e. absorbent toilet paper) as it is rolled into its ribbon-like configuration.

While the additional water reactive material 21a may be comprised of various water reactive materials, e.g. salt, sugar, paper, preferably material 21a is comprised of a mass of a water soluble material such as a starch-based, biodegradable material which instantly starts to disintegrate upon contact with water. An example of such a material is the starch-based (e.g. vegetable starch, corn starch, wheat starch, etc.) pellets or "peanuts" of the type commonly used for packing material in shipping containers and which are readily available from several commercial sources. By adding the additional material 21a, bridge portion 22a supporting plunger 23 provides the same support strength while the thickness of material 21 between cartridge housing 18 and sleeve 30 is less thereby keeping the diameter of the unit 16 smaller which can be important in shipping and commercial storage.

Figure 6:
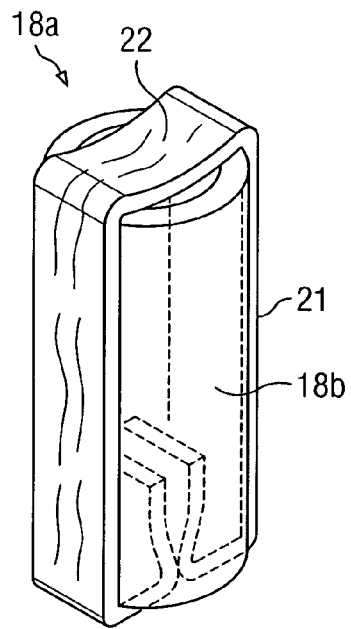
FIG. 6 is a perspective view of a water reactive material cartridge for use in the tripper unit of the present invention.

In some instances, it may be desired to provide replaceable cartridges for a tripper unit such as described above. FIG. 6 illustrates a pre-prepared cartridge 18a which comprises a short, hollow cylindrical support 18b which has layer(s) of water reactive material 21 (e.g. absorbent paper) wrapped around its length to provide a bridge portion 22 across the top of support 18b. The tripper unit 16 described above is slightly modified (not shown) so that cartridge 18a will removably telescope within the lower end of cartridge housing 18 and will be held in position by any commonly known means, e.g. a set screw (not shown). This allows the cartridge to be quickly replaced, if and when required.

Figure 7:
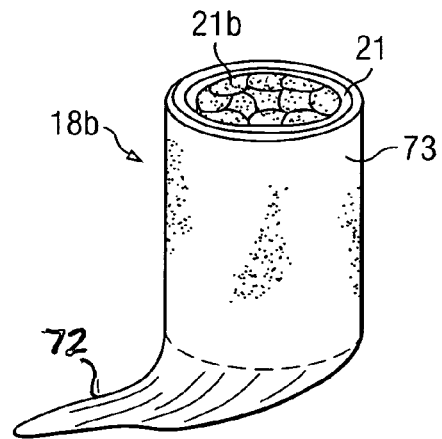
FIG. 7 is a perspective view of another embodiment of a water reactive material cartridge for use in the tripper unit of present invention.

FIG. 7 discloses a further embodiment of a replaceable cartridge 18b which is formed by wrapping several "peanuts" 21b (i.e. substantially cylindrical lengths) of a starch-based material in a sheet 21 of wicking material (e.g. water-absorbent paper such as toilet paper) and placing the package in a cylindrical support 73. In their normal state, peanuts 21b are highly porous and fragile so as each peanut is wrapped, the sheet 21 is preferably pulled tightly around each peanut to compress it to remove as much air as possible, making the cartridge a substantially rigid mass when completed.

Sheet 21 is of a sufficient length so that when the desired number of peanuts 21b have been tightly wrapped and the package is within support 73, the remaining length of the sheet will form a wicking tail 72 to absorb and wick any water from a leak or the like. While cartridge 18b is described as being formed of peanuts 21b, it should be recognized that the single unit or mass (not shown) with the wicking material wrapped thereon or formed integral therewith.

Again, it is emphasized that in each embodiment of the tripping unit 16, the cartridge used therein can easily and quickly be replaced once the unit has been tripped with only a minimum of time and expense involved. It should be understood that cartridges 19 can be factory prepared and sold as replacement parts or a user can easily remove a used cartridge, rewrap, and replace it when necessary. This allows the unit to be used over and over again while other commercial units can only be used once. Also, the water reactive material used is highly, ecologically friendly and posed no health or disposal problem with its use.

Further, while the tripper unit of the present invention have been illustrated in conjunction with valve actuators, it should be recognized that the tripper unit, itself, and the principles involved therewith can be used to trigger other devices, e.g. set off an alarm upon the unexpected presence of water.

What is claimed is:

1. A tripper unit for actuating a device upon contact with water, said tripping unit comprising:
   a housing adapted to be positioned substantially on a surface susceptible to a water leak, said housing being positioned to allow the flow of water from said surface to said housing;
   a hollow, cartridge mounted in said housing;
   a water reactive material across at least one end of said hollow cartridge, the integrity and strength of said material weakening when contacted by water; and
   a plunger positioned so that the lower end of said plunger rests on and is supported by said water reactive material across said at least one end of said cartridge when said material is dry, said plunger being free to move into said cartridge when said water reactive material comes into contact with water; and
   a compression spring positioned in said housing to normally bias said plunge downward onto said water reactive material when is a non-actuated position and to force said plunger downward into said hollow cartridge to actuate said unit when said water reactive material comes into contact with water.

2. The tripper unit of claim 1 wherein said water reactive material comprises:
   an absorbent paper material.

3. The tripper unit of claim 2 wherein said water reactive material comprises:
   a strip of absorbent paper which is wrapped completely around the sides and ends of said cartridge.

4. The tripper unit of claim 3 wherein said water reactive material comprises:
   toilet paper.

5. The automatic flow shut-off system of claim 1 is used to shut the water off to a hot water tank, said system including:
   means for securing said housing of said tripper unit to the lower end of said tank.

6. The automatic flow shut-off system of claim 5 where said means for securing said housing of said tripper unit to the lower end of said tank comprise:
   hook tape.

7. An automatic flow shut-off system for closing a valve in a water supply line to shut off the flow of water to an appliance when a leak develops at said appliance; said system compromising:
   a valve actuator adapted to be connected to said valve to close said valve when said valve actuator is actuated; and a tripper unit responsive to said leak for actuating said valve actuator; said tripper unit comprising;

a cylindrical housing adapted to be positioned on a surface adjacent said appliance when in an operable position, said housing having openings therein to allow the flow of water from said surface into said housing;

a hollow, cartridge mounted in said housing;

a water reactive material across at least one end of said hollow cartridge, the integrity and strength of said material weakening when contracted by water;

a plunger positioned so that the lower end of said plunger rests on and is supported by said water reactive material across said at least one end of said cartridge when said material is dry, said plunger being free to move into said cartridge when said water reactive material comes into contact with water; and a compression spring positioned in said housing to normally bias said plunger downward onto said water reactive material when in a non-actuated position and to force said plunger downward into said hollow cartridge to actuate said unit when said water reactive material comes into contact with water and;

means adapted for connecting said plunger to said valve actuator whereby said valve actuator is actuated upon downward movement of said plunger in said housing of said tripper unit.

8. The automatic flow shut-off system of claim 7 wherein said means for connecting said plunger to said valve actuator comprises:

a length of flexible material connected at one end to said valve actuator and at its other end to said plunger.

9. The automatic flow shut-off system of claim 7 wherein said water reactive material comprises:

an absorbent paper material.

10. The automatic flow shut-off system of claim 9 wherein said water reactive material comprises:

toilet paper.

* * * * *